(12) United States Patent
Ikeda et al.

(10) Patent No.: US 9,689,113 B2
(45) Date of Patent: Jun. 27, 2017

(54) TRANSFER FILM, METHOD FOR PRODUCING TRANSFER FILM, AND TRANSFER METHOD

(71) Applicant: MIMAKI ENGINEERING CO., LTD., Nagano (JP)

(72) Inventors: Akira Ikeda, Nagano (JP); Akira Kawabata, Nagano (JP); Yoshimitsu Komiyama, Nagano (JP); Tomotaka Furuhata, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 14/441,514

(22) PCT Filed: Nov. 20, 2013

(86) PCT No.: PCT/JP2013/081229
§ 371 (c)(1),
(2) Date: May 8, 2015

(87) PCT Pub. No.: WO2014/080923
PCT Pub. Date: May 30, 2014

(65) Prior Publication Data
US 2015/0292150 A1 Oct. 15, 2015

(30) Foreign Application Priority Data

Nov. 22, 2012 (JP) .................................. 2012-256889

(51) Int. Cl.
*D06Q 1/00* (2006.01)
*B05D 3/00* (2006.01)
(Continued)

(52) U.S. Cl.
CPC ............... *D06Q 1/08* (2013.01); *B05D 3/067* (2013.01); *B32B 7/12* (2013.01); *B32B 27/08* (2013.01);
(Continued)

(58) Field of Classification Search
CPC ... D06Q 1/00; D06Q 1/08; B05D 3/00; B05D 3/067; B32B 7/00; B32B 7/12;
(Continued)

(56) References Cited

U.S. PATENT DOCUMENTS 5,560,796 A * 10/1996 Yoshimura ............ B44C 1/1716
156/240
7,081,324 B1 7/2006 Hare et al.
8,911,073 B2 * 12/2014 Ohnishi ................. B41J 2/0057
347/102

FOREIGN PATENT DOCUMENTS

EP 1637349 3/2006
JP 8-207500 8/1996
(Continued)

OTHER PUBLICATIONS

"Search Report of European Counterpart Application", issued on Aug. 18, 2015, p. 1-p. 6.
(Continued)

*Primary Examiner* — Jacob T Minskey
*Assistant Examiner* — Matthew Hoover
(74) *Attorney, Agent, or Firm* — Jianq Chyun IP Office

(57) ABSTRACT

An object is to obtain a pattern-transferred product excellent in fastness to washing. To achieve the object, the invention provides: a transfer film (10) including a transfer sheet (11) and a solvent UV ink layer (2) formed on the transfer sheet (11); and a transfer method including a hot-pressing step of sticking the transfer film (10) to the print object (20) and then hot-pressing the transfer film (10).

2 Claims, 2 Drawing Sheets

(51) Int. Cl.
　　　*B32B 7/00*　　　(2006.01)
　　　*B32B 27/00*　　(2006.01)
　　　*B44C 1/00*　　　(2006.01)
　　　*D06Q 1/08*　　　(2006.01)
　　　*B32B 27/16*　　(2006.01)
　　　*B44C 1/17*　　　(2006.01)
　　　*B32B 7/12*　　　(2006.01)
　　　*B32B 27/08*　　(2006.01)
　　　*B32B 27/18*　　(2006.01)
　　　*B05D 3/06*　　　(2006.01)

(52) U.S. Cl.
　　　CPC .............. *B32B 27/16* (2013.01); *B32B 27/18* (2013.01); *B44C 1/17* (2013.01); *B32B 2307/4026* (2013.01); *B32B 2307/558* (2013.01); *B32B 2307/75* (2013.01)

(58) Field of Classification Search
　　　CPC ......... B32B 27/00; B32B 27/08; B32B 27/16; B32B 27/18; B44C 1/00; B44C 1/17
　　　See application file for complete search history.

(56) References Cited

FOREIGN PATENT DOCUMENTS

| JP | H08207500 | 8/1996 |
| JP | H0944091 | 2/1997 |
| JP | H1152866 | 2/1999 |
| JP | 2007223291 | 9/2007 |
| JP | 2008069231 | 3/2008 |
| JP | 2010-012777 | 1/2010 |
| JP | 2010280828 | 12/2010 |
| JP | 2011190342 | 9/2011 |
| JP | 2012-201105 | 10/2012 |
| JP | 2012214009 A * | 11/2012 |
| WO | 2012132163 | 10/2012 |

OTHER PUBLICATIONS

"International Search Report (Form PCT/ISA/210)", mailed on Feb. 18, 2014, with English translation thereof, pp. 1-2.

"Office Action of Korea Counterpart Application" with machine translation, issued on Jul. 26, 2016, p. 1-p. 7.

"Office Action of Japan Counterpart Application" with English translation, issued on Apr. 26, 2016, p. 1-p. 8.

"Office Action of Japan Counterpart Application" with English translation thereof, issued on Nov. 8, 2016, p. 1-p. 8.

"Search Report of Europe Counterpart Application", issued on Jun. 23, 2016, p. 1-p. 6.

"First Office Action of China Counterpart Application" with English translation thereof, issued on Jan. 4, 2017, p. 1-p. 13.

* cited by examiner

Hot-pressing

TRANSFER FILM, METHOD FOR PRODUCING TRANSFER FILM, AND TRANSFER METHOD

CROSS-REFERENCE TO RELATED APPLICATION

This application is a 371 application of an international PCT application Ser. No. PCT/JP2013/081229, filed on Nov. 20, 2013, which claims the priority benefit of Japan application no. JP 2012-256889, filed on Nov. 22, 2012. The entirety of each of the above-mentioned patent applications is hereby incorporated by reference herein and made a part of this specification.

TECHNICAL FIELD

The invention relates to transfer films, transfer film production methods, and transfer methods using the transfer films.

BACKGROUND ART

The patent document 1 describes a known method for forming pattern layers on fabric, for example, woven fabric or knitted fabric. The method described in the patent document 1 forms a pattern layer from a pigment-containing ultraviolet curable resin on a fibrous medium.

PRIOR ART DOCUMENT

Patent Document

Patent Document 1: JP 2010-12777 A (disclosed on Jan. 21, 2010).

SUMMARY OF THE INVENTION

Problems to be Solved by the Invention

However, there are problems with the method described in the patent document 1 that uses ultraviolet curable ink to form a pattern layer on fabric. One problem is poor fastness to washing of the fabric after the pattern layer is formed thereon, possibly fading or blurring the pattern layer when the fabric is washed.

To subject the ultraviolet curable ink spread on the fabric to a decorating process, it is necessary to temporarily cure the ultraviolet curable ink to increase its viscosity in order to prevent smearing of the ink before the decorating process. Yet, it is still very difficult to control curing of the ultraviolet curable ink in order to prevent smearing of the ink and attain a degree of viscosity that ensures enough stickiness for the decorating process.

The invention was accomplished to solve these problems. The invention has an object to provide a transfer film that enables to obtain a pattern-transferred product excellent in fastness to washing, a method for producing the transfer film, and a transfer method using the transfer film.

Solutions to the Problems

To solve the problems, the invention provides a transfer film including a transfer sheet, and a solvent UV ink layer formed on the transfer sheet.

According to the above configuration, the transfer film includes the solvent UV ink layer formed on the transfer sheet. Therefore, the solvent UV ink layer can be transferred onto a print object by simply sticking the transfer film to the print object. The solvent UV ink layer formed from a solvent UV ink has remarkable fastness to washing, effectively preventing a transferred pattern from fading or blurring even after repeated washes. The transfer film is advantageously suitable for transferring patterns onto clothes such as T-shirts desirably excellent in fastness to washing.

Preferably, the transfer film according to the invention further includes a decorative material adhered to the solvent UV ink layer, or a decorative layer containing the decorative material and formed on the solvent UV ink layer.

According to the technical feature, the solvent UV ink layer is decorated with the decorative material. Drying the solvent UV ink layer volatilizes an organic solvent contained therein, increasing the viscosity of the solvent UV ink layer. Still, a degree of viscosity required for the decorating process is ensured. This allows the solvent UV ink layer to be finely decorated without the risk of smearing the solvent UV ink layer. The transfer film thus advantageously enables to obtain a commercially valuable product with an elaborate transferred pattern printed thereon.

A method for producing a transfer film according to the invention includes: a forming step of forming a solvent UV ink layer on a transfer sheet; a drying step of drying the solvent UV ink layer; and a curing step of curing the dried solvent UV ink layer by delivering thereon ultraviolet.

According to the technical feature, the solvent UV ink layer is formed on the transfer sheet and then dried. Drying the solvent UV ink layer volatilizes an organic solvent contained therein, increasing the viscosity of the solvent UV ink layer. This can effectively prevent smearing of the solvent UV ink layer.

Then, the dried solvent UV ink layer is cured by delivering thereon ultraviolet to obtain a desired transfer film. The transfer film thus obtained is provided with the solvent UV ink layer and excellent in fastness to washing, effectively preventing a transferred pattern from fading or blurring even after repeated washes. This method can produce a transfer film advantageously suitable for transferring patterns onto clothes such as T-shirts desirably excellent in fastness to washing.

Preferably, the method for producing a transfer film according to the invention further includes, between the drying step and the curing step, a decorating step of adhering a decorative material to the dried solvent UV ink layer or forming a decorative layer containing the decorative material on the dried solvent UV ink layer.

According to the technical feature, the dried solvent UV ink layer is decorated before the curing step. The solvent UV ink layer, though increased in viscosity by drying, is still uncured, maintaining its stickiness. In the decorating step, therefore, the decorative material or the decorative layer containing the decorative material can be favorably securely adhered to the solvent UV ink layer without using an additional material, for example, primer.

By further subjecting the solvent UV ink layer to the decorating step, the method can produce a transfer film that enables to obtain a commercially valuable product with an elaborate transferred pattern printed thereon.

Preferably, the drying step of the method for producing a transfer film according to the invention preheats the solvent UV ink layer at a temperature between 40° C. and 60° C., heats the preheated solvent UV ink layer at a temperature between 35° C. and 55° C., and then post-heats the heated solvent UV ink layer at a temperature between 40° C. and 60° C.

According to the above configuration, the solvent UV ink layer is heated to be dried in the drying step. At this time, the solvent UV ink layer is heated at different temperatures in stages; preheating at a temperature between 40° C. and 60° C., heating at a temperature between 35° C. and 55° C., and post-heating at a temperature between 40° C. and 60° C.

The solvent UV ink layer can accordingly be prevented from smearing and suitably dried at the same time to a degree of viscosity that ensures enough stickiness for the decorating process.

A transfer method according to the invention includes a hot-pressing step of sticking any one of the transfer films described so far to a print object and hot-pressing the transfer film.

By sticking the transfer film to a print object, and then heating and pressing the transfer film by hot-pressing, the transfer method can transfer the transfer film onto the print object and thereby obtain a desired pattern-transferred product. By using the transfer film with the solvent UV ink layer, the transfer method can obtain a pattern-transferred product excellent in fastness to washing.

The transfer method according to the invention preferably uses fabric as the print object. By using fabric as the print object, the transfer method can provide a pattern-transferred fabric product excellent in fastness to washing. The transfer method is advantageously suitable for transferring patterns onto clothes such as T-shirts desirably excellent in fastness to washing.

Effects of the Invention

The invention providing the transfer film with the solvent UV ink layer formed on the transfer sheet can obtain a pattern-transferred product excellent in fastness to washing.

EMBODIMENTS OF THE INVENTION

Hereinafter, an embodiment of the invention is described in detail referring to FIGS. 1A to 1E. FIGS. 1A to 1E are schematic illustrations of a transfer method according to an embodiment of the invention.

[Transfer Film 10]

Figure 1A:
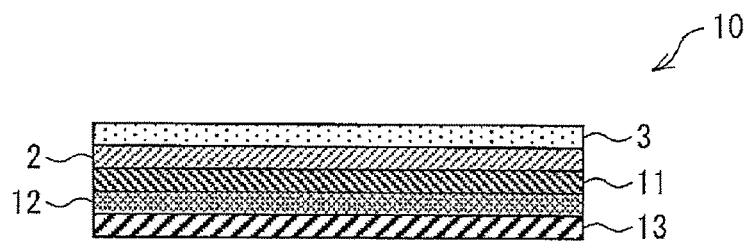
FIGS. 1A to 1E are schematic illustrations of a transfer method according to an embodiment of the invention.

As illustrated in FIG. 1A, a transfer film 10 according to an embodiment of the invention has a transfer sheet 11, and a solvent UV ink layer 2 formed on the transfer sheet 11. In the transfer film 10, an adhesive layer 12 may be formed on a surface of the transfer sheet 11 opposite to the surface with the solvent UV ink layer 2 formed thereon. Optionally, the transfer film 10 has a decorative layer 3 formed on the solvent UV ink layer 2 and/or a strippable sheet 13 formed on the adhesive layer 12. Optionally, the transfer film 10 has a protective film 14 formed on the decorative layer 3.

[Transfer Sheet 11]

The transfer sheet 11 is a sheet from which the solvent UV ink layer 2 is transferred onto a print object 20. The transfer sheet 11 may be a sheet stretchable on the print object 20, following expansions and contractions of the print object 20 after the transfer of the solvent UV ink layer 2. By using the transfer sheet 11 with such stretchability that follows expansions and contractions of the print object 20, the solvent UV ink layer 2 on the transfer sheet 11 is not or hardly torn by a force generated by expansions and contractions of the print object 20.

A suitable example of the transfer sheet 11 may be one selected from the conventional rubber sheets. A particularly preferable example of the rubber sheets is a urethane rubber sheet.

[Solvent UV Ink Layer 2]

The solvent UV ink layer 2 is an ink layer formed from a solvent UV ink. The solvent UV ink layer 2 may be formed by spreading the solvent UV ink on the transfer sheet 11.

[Solvent UV Ink]

The solvent UV ink contains a UV-curable resin (ultraviolet curable resin) and an organic solvent in which the UV-curable resin is dissolved. The solvent UV ink may further contain a pigment, a photopolymerization initiator, and/or a sensitizer.

<UV-curable Resin>

The UV-curable resin contained in the solvent UV ink may be one selected from monomers, oligomers, and polymers cured by photopolymerization. The UV-curable resin may be any suitable one of the commercially available monomers, oligomers, and polymers.

Examples of the monomers, oligomers, and polymers cured by photopolymerization initiated by ultraviolet irradiation include cationically polymerizable materials, radically polymerizable materials, and mixtures of such materials. Any suitable one of these ultraviolet curable resins may be singly used, or two or more of them may be mixed and used.

In the solvent UV ink, the content of any suitable one selected from the monomers, oligomers, and polymers cured by photopolymerization initiated by ultraviolet irradiation is preferably equal to or greater than 3 wt. % and equal to or less than 90 wt. % of a total quantity of the ink composition. The content is more preferably equal to or greater than 5 wt. % and equal to or less than 30 wt. % of a total quantity of the ink composition. The solvent UV ink containing the UV-curable resin by a weight percentage in the range can be more favorably cured by ultraviolet irradiation.

<Organic Solvent>

The organic solvent contained in the solvent UV ink may be any suitable one selected from UV-curable resin soluble materials that are volatilized by heat-drying the solvent UV ink. Examples of such an organic solvent include, but are not limited to, ketones, alcohols, ethers, hydrocarbons, glycols, glycolether acetates, glycolethers, esters, and pyrrolidones.

Examples of the ketones include acetone, methyl ethyl ketone, cyclohexanon, and 2-heptanone. Examples of the alcohols include methanol, ethanol, isopropanol, n-hexylalcohol, isoheptyl alcohol, 2-ethylhexyl alcohol, n-octyl alcohol, 3-methyl-3-methoxybutanol, and 3-methoxybutanol.

Examples of the ethers include cellosolve and butyl cellosolve. Examples of the hydrocarbons include toluene, xylene, turpentine oil, limonene, industrial volatile oils, tetrahydronaphthalene, and decahydronaphthalene. Examples of the glycols include ethylene glycol, diethylene glycol, thiodiethylene glycol, triethylene glycol, propylene glycol, dipropylene glycol, and tripropylene glycol.

Examples of the glycol acetates include ethylene glycol monoethyl ether acetate, ethylene glycol monobutyl ether acetate, diethylene glycol monoethyl ether acetate, and diethylene glycol monobutyl ether acetate.

Examples of the glycolethers include ethylene glycol monohexyl ether, ethylene glycol-2-ethylhexyl ether, ethylene glycol phenyl ether, propylene glycol monoethyl ether, propylene glycol propyl ether, propylene glycol monobutyl ether, diethylene glycol monomethyl ether, diethylene glycol monoethyl ether, diethylene glycol monobutyl ether, diethylene glycol hexyl ether, diethylene glycol-2-ethylhexyl ether, dipropylene glycol monomethyl ether, dipropylene glycol monoethyl ether, dipropylene glycol monobutyl ether, dipropylene glycol propyl ether, triethylene glycol monomethyl ether, triethylene glycol monoethyl ether, triethylene glycol monobutyl ether, and tripropylene glycol monomethyl ether.

Examples of the esters include 2,2,4-trimethyl-1,3-pentanediol monoisobutyrate, triethylene glycol di(2-ethylbutyrate), propylene carbonate, ethyl lactate, butyl lactate, methyl acetoacetate, ethyl acetoacetate, dibasic acid ester DBE, and 3-methyl-3-methoxybutyl acetate. An example of the pyrrolidones is N-methyl-2-pyrrolidone.

One selected from the exemplified organic solvents may be singly used, or two or more of them having different boiling points may be suitably combined and used in consideration of solubility of an infiltration-proof material to be used, discharge stability of the ink, and drying property of the ink on a target medium. The content of the organic solvent in the solvent UV ink is preferably equal to or greater than 50 wt. % and equal to or less than 99 wt. % of a total quantity of the ink composition.

<Pigment>

The pigment usable in the solvent UV ink may be one selected from the conventional pigments including black and color pigments. An example of the black pigments is carbon black. Examples of the color pigments include anthraquinones, phthalocyanine blues, phthalocyanine greens, diazos, monoazos, pyranthrones, perylenes, heterocyclic yellows, quinacridones, and (thio)indigoids. Any suitable one may be selected from these pigments or two or more of them may be combined, and then mixed with the ink. If a clear ink is prepared and used as the solvent UV ink, the pigment is preferably not used. Preferably, the content of the pigment in the solvent UV ink is approximately equal to or greater than 3 wt. % and equal to or less than 5 wt. % of a total quantity of the ink composition.

<Photopolymerization Initiator>

The photopolymerization initiator usable in the solvent UV ink is preferably a material capable of efficiently initiating polymerization of the UV-curable resin in response to ultraviolet irradiation. Any suitable one selected from the conventional photopolymerization initiators may be used. Examples of the photopolymerization initiators include alkylphenone-based photopolymerization initiators, thioxanthone-based photopolymerization initiators, acyl phosphine oxide-based photopolymerization initiators, and titanocene-based photopolymerization initiators. Any suitable one may be selected from these photopolymerization initiators or two or more of them may be combined, and then mixed with the ink.

<Sensitizer>

The sensitizer usable in the solvent UV ink is preferably a material capable of efficiently initiating reactions of the photopolymerization initiator in response to ultraviolet irradiation. Any suitable one selected from the conventional sensitizers may be used. Examples of such a sensitizer include amines such as trimethylamine, methyldimethanolamine, triethanolamine, p-diethylaminoacetophenone, ethyl p-dimethylaminobenzoate, isoamyl p-dimethylaminobenzoate, and N,N-dimethylbenzylamine. Any suitable one may be selected from these examples of the sensitizer or two or more of them may be combined, and then mixed with the ink.

<Other Additives>

If necessary, the solvent UV ink may contain other additives in addition to the additives so far described, for example, a diluent, an anti-foaming agent, a pigment dispersant, a slipping agent, a leveling agent, and/or a polymerization inhibitor. Preferably, a summed content of the photopolymerization initiator and the other additives in the solvent UV ink is approximately 10 wt. % of a total quantity of the ink composition.

[Adhesive Layer 12]

The adhesive layer 12 serves to stick the transfer film 10 to the print object 20. To hot-press the transfer film 10 to the print object 20, the adhesive layer 12 is preferably formed from a hot-melt adhesive. As the hot-melt adhesive is preferably used an adhesive containing a thermoplastic resin and solid or semisolid at normal temperature, which is melted by heating and solidified or semi-solidified again by cooling.

The hot-melt adhesive used to form the adhesive layer 12 may be any suitable one selected from the conventional adhesives. The adhesive layer 12 may be obtained by spreading the hot-melt adhesive on the transfer sheet 11 or by bonding a hot-melt adhesive film to the transfer sheet 11.

[Decorative Layer 3]

The decorative layer 3 is used to decorate the solvent UV ink layer 2 with a decorative material. In the transfer film 10, the solvent UV ink layer 2 may be decorated by additionally forming the decorative layer 3 containing the decorative material on the solvent UV ink layer 2, or may be decorated by adhering the decorative material directly to the solvent UV ink layer 2. The decorative layer 3 can be formed on the dried solvent UV ink layer 2 before curing.

Drying the solvent UV ink layer 2 volatilizes the organic solvent contained therein, increasing the viscosity of the solvent UV ink layer 2. Still, a degree of viscosity required for the decorating process is ensured. The solvent UV ink layer 2, therefore, can be favorably decorated by providing the decorative layer 3 thereon without smearing the solvent UV ink layer 2. The transfer film 10 thus advantageously enables to obtain a commercially valuable product with an elaborate transferred pattern printed thereon.

The decorative material may be any suitable one selected from the known lacquerware decorating materials that can be sprinkled on and adhered to the solvent UV ink layer 2. Examples of such decorative materials include particles or fragments of materials such as pigments, metals, beads, gemstones (for example, pearl), and wool yarns. The decorative layer 3 containing the decorative material may be a metallic thin film such as a gold leaf, or a sheet containing particles or fragments of non-metal materials.

Furthermore, urethane resin coating or doming, for example, may be applied to the decorative layer 3 to improve the decorative layer 3 in luster and weather resistance.

[Strippable Sheet 13]

The strippable sheet 13 is intended to protect the adhesive layer 12 before being stuck to the print object 20. The strippable sheet 13 provided on the adhesive layer 12 serves to protect the adhesive layer 12, and further serves to prevent accidental adhesion of the transfer film 10 to any non-target objects. To transfer a pattern from the transfer film 10, the strippable sheet 13 is stripped off the transfer film 10 to expose the adhesive layer 12. Then, the adhesive layer 12 is stuck to the print object 20.

The strippable sheet 13 may be any suitable one selected from the conventional sheets.

[Protective Film 14]

The protective film 14 is intended to protect the solvent UV ink layer 2 or the decorative layer 3 provided thereon. The protective film 14 stuck to the solvent UV ink layer 2 or the decorative layer 3 serves to avoid adhesion of foreign matter such as dust or the impact of any damage to the solvent UV ink layer 2 or the decorative layer 3.

Optionally, the protective film 14 stuck to the solvent UV ink layer 2 or the decorative layer 3 may be a heatproof film, so that the solvent UV ink layer 2 and the decorative layer 3 are protected from heat applied thereto at the time of hot-pressing the transfer film 10 to the print object 20. After the transfer film 10 is heated and contact-bonded to the print object 20, the protective film 14 is peeled off the transfer film 10.

The protective film 14 may be any suitable one selected from the conventional films. The protective film 14 may be a transparent film.

The transfer film 10 has the solvent UV ink layer 2 formed on the transfer sheet 11. Therefore, the solvent UV ink layer 2 can be transferred onto the print object 20 by simply sticking the transfer film 10 to the print object 20. The solvent UV ink layer 2 formed from the solvent UV ink has remarkable fastness to washing, effectively preventing a transferred pattern from fading or blurring even after repeated washes. The transfer film 10 is advantageously suitable for transferring patterns onto clothes such as T-shirts desirably excellent in fastness to washing.

[Transfer Method]

A transfer method according to an embodiment of the invention includes a hot-pressing step of sticking the transfer film 10 to the print object 20 and then hot-pressing the transfer film 10. The transfer method may further include a cutting step, a film sticking step, and an adhesive layer sticking step prior to the hot-pressing step. The transfer method may further include a film peeling step subsequent to the hot-pressing step.

[Print Object 20]

In the transfer method, the print object 20 of the transfer film 10 may be any suitable one selected from a variety of different types of products. A particularly preferable example is fabric. The fabric is a fiber base material such as woven fabric, knitted fabric, and unwoven fabric, and a material for, for example, clothes such as T-shirts. The transfer method according to this embodiment can provide a pattern-transferred fabric product excellent in fastness to washing. In the transfer method, therefore, clothes more desirably excellent in fastness to washing, such as T-shirts, are suitably used as the print object 20.

In the case where the print object 20 is a product wound in the form of a roll, the print object 20 is unwound before the transfer film 10 is stuck thereto. After the transfer film 10 is contact-bonded by hot-pressing to the print object 200, the print object 20 is wound back into the roll.

[Cutting Step]

To start the transfer method, the transfer film 10 with the solvent UV ink layer 2 formed in a desired shape is prepared and cut in an arbitrary shape as illustrated in FIG. 1A. Optionally, the transfer sheet 11 may additionally have the strippable sheet 13 and the decorative layer 3. The strippable sheet 13 is provided on the adhesive layer 12 formed on a surface of the transfer sheet 11 opposite to the surface with the solvent UV ink layer 2 formed thereon. The decorative layer 3 is provided on the solvent UV ink layer 2. A conventional cutting technique may be employed to cut the transfer film 10.

[Film Sticking Step]

Figure 1B:
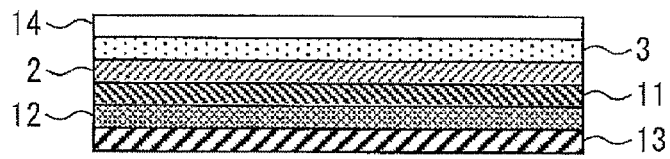

As illustrated in FIG. 1B, the heatproof protective film 14 is stuck to the decorative layer 3 to protect the decorative layer 3 in the subsequent hot-pressing step. The protective film 14 can be stuck to the decorative layer 3 by using an adhesive.

[Adhesive Layer Sticking Step]

Figure 1C:
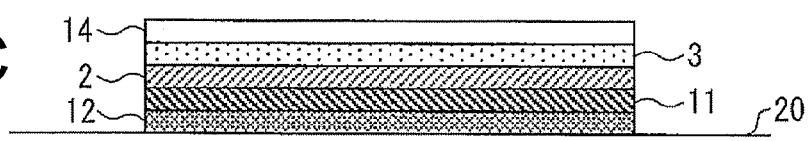
Figure 1C:
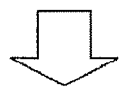

As illustrated in FIG. 1C, after transfer film 10 is cut and the protective film 14 is stuck thereto, the adhesive layer 12 is stuck to the print object 20. The strippable sheet 13, if stuck to the transfer film 10, is stripped off the transfer film 10 to expose the adhesive layer 12. Then, the adhesive layer 12 is stuck to the print object 20.

[Hot-Pressing Step]

Figure 1D:
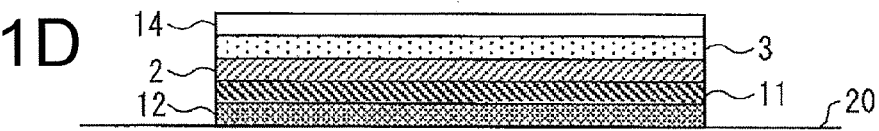

As illustrated in FIG. 1D, the transfer film 10 stuck to the print object 20 is heated and pressed by hot-pressing and thereby contact-bonded to the print object 20, so that the solvent UV ink layer 2 of the transfer film 10 is transferred onto the print object 20. As a result, a pattern-transferred product can be successfully obtained.

Any suitable conventional technique may be employed to hot-press the transfer film 10 to the print object 20. The hot-pressing step does not require any specific hot-press conditions as far as the transfer film 10 is favorably contact-bonded to the print object 20. The heating temperature during the hot-pressing is preferably equal to or lower than the heatproof temperature of the protective film 14 but high enough to melt the hot-melt adhesive of the adhesive layer 12. Such a range of heating temperatures is specifically 130° C. to 160° C., and preferably 140° C. to 150° C.

The pressure during the hot-pressing is preferably strong enough to favorably contact-bond the melted adhesive layer 12 to the print object 20 but also not too strong to tear the transfer film 10. Specifically, the pressure is preferably equal to or greater than 0.01 kPa and equal to or less than 0.1 kPa, and more preferably equal to or greater than 0.03 kPa and equal to or less than 0.07 kPa. The length of time of the hot-pressing may be, for example, 5 seconds or more and 20 seconds or less.

FIG. 1D illustrates the hot-pressing applied to the transfer film 10 from a side thereof provided with the protective film 14. Instead, the hot-pressing may be applied to the transfer film 10 from the opposite side provided with the print object 20 in a manner that the print object 20 is pushed against the transfer film 10, or the hot-pressing may be applied from both sides of the transfer film 10.

[Film Peeling Step]

Figure 1E:
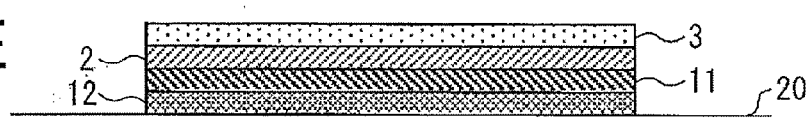

Lastly, the protective film 14 is peeled off the transfer film 10 contact-bonded to the print object 20 as illustrated in FIG. 1E to obtain a desired pattern-transferred product.

By sticking the transfer film 10 to the print object 20 and subjecting them to hot-pressing, the solvent UV ink layer 2 can be transferred from the transfer film 10 onto the print object 20 to obtain a desired pattern-transferred product. Thus, the transfer film 10 with the solvent UV ink layer 2 enables to obtain a pattern-transferred product excellent in fastness to washing.

[Transfer Film Production Method]

A transfer film production method according to an embodiment of the invention includes: a forming step of forming the solvent UV ink layer 2 on the transfer sheet 11; a drying step of drying the solvent UV ink layer 2; and a curing step of curing the dried solvent UV ink layer 2 by delivering thereon ultraviolet. The transfer film production method may further include a decorating step between the drying step and the curing step.

The transfer film production method according to the embodiment is hereinafter described referring to FIGS. 2A to 2D. FIGS. 2A to 2D are schematic illustrations of the transfer film production method according to the embodiment of the invention. FIGS. 2A to 2D illustrate steps of forming the solvent UV ink layer 2 on the transfer sheet 11 before the adhesive layer 12 is formed thereon. It is optionally decided which one of the solvent UV ink layer 2 and the adhesive layer 12 is provided on the transfer sheet 11 before or after the other.

[Forming Step]

Figure 2A:
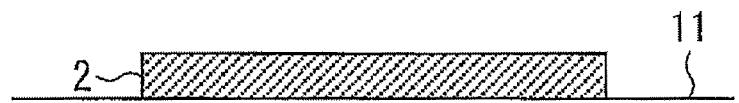
FIGS. 2A to 2D are schematic illustrations of a transfer film production method according to an embodiment of the invention.

As illustrated in FIG. 2A, the forming step forms the solvent UV ink layer 2 on the transfer sheet 11. The solvent UV ink layer 2 is formed on a surface of the transfer sheet 11 opposite to the surface with the adhesive layer 12 formed thereon. The solvent UV ink layer 2 can be formed by spreading the solvent UV ink on the transfer sheet 11 in any desired shape. An inkjet print device, for example, is used to spread the solvent UV ink on the transfer sheet 11.

[Drying Step]

Figure 2B:
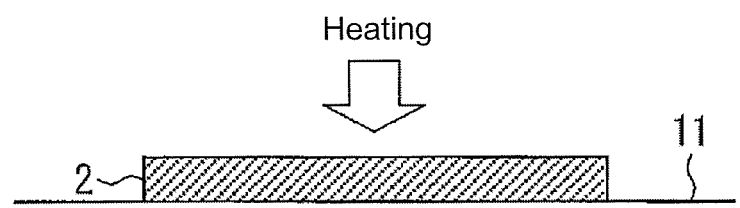

As illustrated in FIG. 2B, the drying step dries the solvent UV ink layer 2 formed on the transfer sheet 11. The drying step dries the solvent UV ink layer 2 by, for example, heating the solvent UV ink layer 2 to volatilize the organic solvent in the layer 2. FIG. 2B illustrates the heating directly applied to the solvent UV ink layer 2 formed on the transfer sheet 11. Instead, the solvent UV ink layer 2 may be heated from the opposite side through the transfer sheet 11.

Optionally, the drying step preheats the solvent UV ink layer 2 at a temperature between 40° C. and 60° C., heats the preheated solvent UV ink layer 2 at a temperature between 35° C. and 55° C., and then post-heats the heated solvent UV ink layer 2 at a temperature between 40° C. and 60° C. Preferably, the heating temperatures in the drying step are 60° C. for preheating, 55° C. for heating, and 60° C. for post-heating. By thus heating and drying the solvent UV ink layer 2 at the varying heating temperatures, the solvent UV ink layer 2 can be moderately dried to such an extent that fulfills the purposes; preventing smearing of the ink, and attaining a degree of viscosity that ensures enough stickiness for the subsequent decorating step.

The length of drying time in the drying step may be suitably decided to impart a desired viscosity to the solvent UV ink layer 2.

Drying the solvent UV ink layer 2 in the drying step increases the viscosity of the solvent UV ink layer 2. This effectively prevents the solvent UV ink layer 2 from smearing on the transfer sheet 11, and further ensures a moderate degree of viscosity that allows the solvent UV ink layer to be decorated with the decorative material in the subsequent decorating step.

[Decorating Step]

Figure 2C:
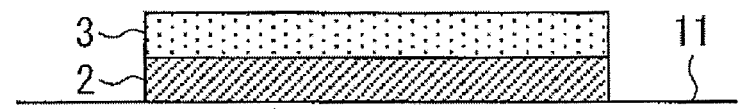

As illustrated in FIG. 2C, the decorating step adheres the decorative material to the dried solvent UV ink layer 2 or forms the decorative layer 3 containing the decorative material on the dried solvent UV ink layer 2. That is, the decorating step decorates the dried solvent UV ink layer 2 with the decorative material. The solvent UV ink layer 2, though increased in viscosity by drying, is still uncured, maintaining enough stickiness. Therefore, an additional material, such as primer, is unnecessary to decorate the solvent UV ink layer 2.

[Curing Step]

Figure 2D:
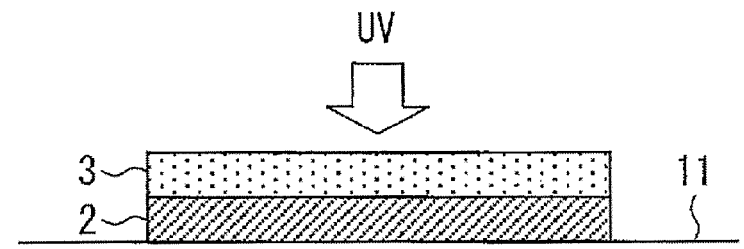

As illustrated in FIG. 2D, the curing step cures the decorated solvent UV ink layer 2 by delivering thereon ultraviolet (UV). A conventional technique using, for example, LED or metal halide lamp, may be employed to deliver ultraviolet on the solvent UV ink layer 2. The wavelength of ultraviolet delivered on the solvent UV ink layer 2 is not particularly limited as long as the solvent UV ink layer 2 can be adequately cured.

FIG. 2D illustrates the ultraviolet irradiation on the solvent UV ink layer 2 through the decorative layer 3 formed thereon. However, in the case where the transfer sheet 11 is an ultraviolet transmittable sheet, ultraviolet may be delivered on the solvent UV ink layer 2 from the opposite side through the transfer sheet 11.

In the print object after the curing step, urethane resin coating or doming, for example, may be further applied to the decorative layer 3 to improve the decorative layer 3 in luster and weather resistance. Optionally, an adhesive layer is formed on a surface of the transfer sheet 11 opposite to the surface with the solvent UV ink layer 2 formed thereon. Then, a strippable sheet may be stuck to the adhesive layer, and/or a protective film may be stuck to the decorative layer 3.

The transfer film production method according to the embodiment of the invention described so far can successfully produce a transfer film less likely to smear the ink, excellent in fastness to washing, and favorably decorated. That is, the transfer film 10 is an example of transfer films that can be produced by the transfer film production method according to the invention.

The transfer film obtained as described thus far has remarkable fastness to washing, effectively preventing the decorative layer and printed pattern from fading or blurring even after repeated washes. This method is advantageously suitable for transferring patterns onto clothes such as T-shirts desirably excellent in fastness to washing.

[Supplementary Notes]

The transfer film 10 has the transfer sheet 11 and the solvent UV ink layer 2 formed on the transfer sheet 11.

By virtue of the structure of transfer film 10 in which the solvent UV ink layer 2 is formed on the transfer sheet 11, the solvent UV ink layer 2 can be transferred onto the print object 20 by simply sticking the transfer film 10 to the print object 20. The solvent UV ink layer 2 formed from the solvent UV ink has remarkable fastness to washing, effectively preventing a transferred pattern from fading or blurring even after repeated washes. Therefore, the transfer film 10 is advantageously suitable for transferring patterns onto clothes such as T-shirts desirably excellent in fastness to washing.

In the transfer film 10, the decorative material is adhered to the solvent UV ink layer 2, or the decorative layer 3 containing the decorative material is formed on the solvent UV ink layer 2.

Thus, the solvent UV ink layer 2 is decorated with the decorative material. Drying the solvent UV ink layer 2 volatilizes the organic solvent contained therein, increasing the viscosity of the solvent UV ink layer 2. Still, a degree of viscosity required for the decorating process is ensured. This allows the solvent UV ink layer 2 to be finely decorated without the risk of smearing the solvent UV ink layer 2. The transfer film 10 thus advantageously enables to obtain a commercially valuable product with an elaborate transferred pattern printed thereon.

A method for producing the transfer film 10 includes: a forming step of forming the solvent UV ink layer 2 on the transfer sheet 11; a drying step of drying the solvent UV ink layer 2; and a curing step of curing the dried solvent UV ink layer 2 by delivering thereon ultraviolet.

Thus, the solvent UV ink layer 2 formed on the transfer sheet 11 is dried. Drying the solvent UV ink layer 2 volatilizes the organic solvent contained therein, increasing the viscosity of the solvent UV ink layer 2. This effectively prevents smearing of the solvent UV ink layer 2.

Then, the dried solvent UV ink layer 2 is cured by delivering thereon ultraviolet to obtain the transfer film 10. The transfer film 10 thus obtained is provided with the solvent UV ink layer 2 and excellent in fastness to washing, effectively preventing a transferred pattern from fading or blurring even after repeated washes. This method can produce the transfer film 10 advantageously suitable for transferring patterns onto clothes such as T-shirts desirably excellent in fastness to washing.

The method for producing the transfer film 10 further includes, between the drying step and the curing step, a decorating step of adhering the decorative material to the dried solvent UV ink layer 2 or forming the decorative layer 3 containing the decorative material on the dried solvent UV ink layer 2.

Thus, the dried solvent UV ink layer 2 is decorated before the curing step. The solvent UV ink layer 2, though increased in viscosity by drying, is still uncured, maintaining enough stickiness. In the decorating step, therefore, the decorative material or the decorative layer 3 containing the decorative material can be favorably securely adhered to the solvent UV ink layer 2. This makes it unnecessary to use an additional material, such as primer, to adhere the decorative layer 3 to the solvent UV ink layer 2.

By further subjecting the solvent UV ink layer 2 to the decorating step, the method can produce a transfer film that enables to obtain a commercially valuable product with an elaborate transferred pattern printed thereon.

The drying step of the method for producing the transfer film 10 preheats the solvent UV ink layer 2 at a temperature between 40° C. and 60° C., heats the preheated solvent UV ink layer 2 at a temperature between 35° C. and 55° C., and then post-heats the heated solvent UV ink layer 2 at a temperature between 40° C. and 60° C.

To heat and dry the solvent UV ink layer 2 in the drying step, the solvent UV ink layer 2 is heated at different temperatures in stages; preheating at a temperature between 40° C. and 60° C., heating at a temperature between 35° C. and 55° C., and post-heating at a temperature between 40° C. and 60° C.

The solvent UV ink layer 2 can accordingly be prevented from smearing and dried at the same time to a degree of viscosity that ensures enough stickiness for the decorating process.

The transfer method includes a hot-pressing step of sticking one of the transfer films 10 to the print object 20 and hot-pressing the transfer film 10.

By sticking the transfer film 10 to the print object 20, and then heating and pressing the transfer film 10 by hot-pressing, the transfer method can transfer the transfer film 10 onto the print object 20 and thereby obtain a desired pattern-transferred product. Thus, the transfer film 10 with the solvent UV ink layer 2 enables to obtain a pattern-transferred product excellent in fastness to washing.

The transfer method uses fabric as the print object 20. By using fabric as the print object, the transfer method can provide a pattern-transferred fabric product excellent in fastness to washing. The transfer method is advantageously suitable for transferring patterns onto clothes such as T-shirts desirably excellent in fastness to washing.

The invention is not necessarily limited to the embodiments described so far and may be carried out in many other forms. The technical scope of the invention encompasses any modifications within the scope of the invention defined by the appended claims and embodiments obtained by variously combining the technical means disclosed herein.

INDUSTRIAL APPLICABILITY

The invention is advantageously applicable to printing techniques.

The invention claimed is:

1. A method for producing a transfer film, comprising:
providing a transfer sheet comprising a back surface and a front surface, wherein the back surface is opposite to the front surface, and an adhesive layer is formed on the front surface;
a forming step of forming a solvent UV ink layer on the back surface of the transfer sheet by an inkjet printing method;
a drying step of heating the solvent UV ink layer to volatilize a solvent in the solvent UV ink layer while maintaining a stickiness of the solvent UV ink layer;
a curing step of curing the solvent UV ink layer after the solvent has been volatilized by delivering thereon ultraviolet; and
a decorating step between the drying step and the curing step, wherein the decorating step is performed by adhering a decorative material on the solvent UV ink layer while maintaining the stickiness of the solvent UV ink layer or by forming a decorative layer containing a decorative material on the solvent UV ink layer while maintaining the stickiness of the solvent UV ink layer.

2. The method for producing a transfer film as claimed in claim 1, wherein
in the drying step,
the solvent UV ink layer is preheated at a temperature between 40° C. and 60° C.,
the preheated solvent UV ink layer is heated at a temperature between 35° C. and 55° C., and
the heated solvent UV ink layer is post-heated at a temperature between 40° C. and 60° C.

* * * * *